(No Model.)
A. J. PRICE.
ATTACHMENT FOR HARVESTERS.
No. 414,121. Patented Oct. 29, 1889.
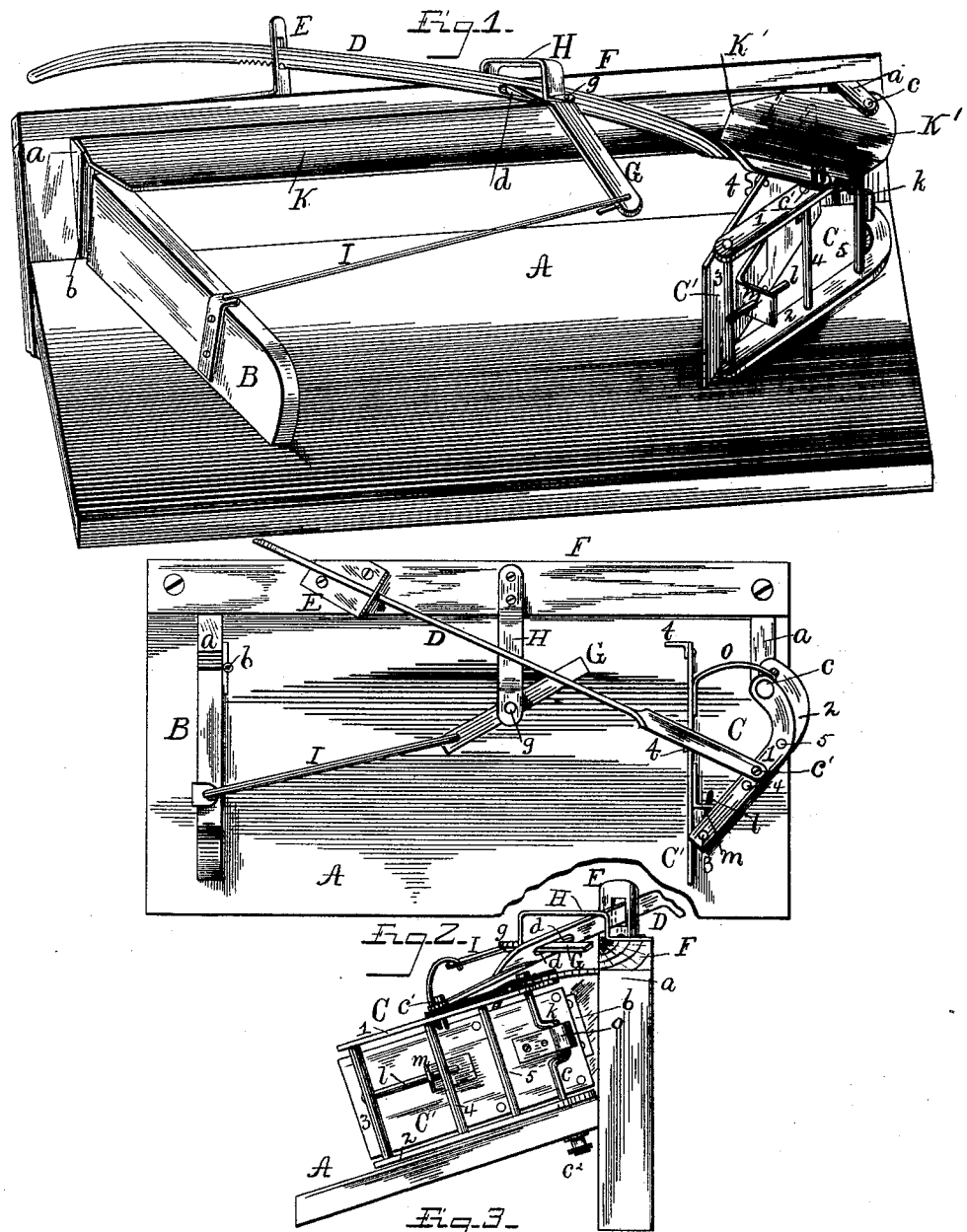
Witnesses
John Bailey Johns.
Wm F. Brereton
Abner J. Price   Inventor
By his Attorney
J. W. Tallmadge

UNITED STATES PATENT OFFICE.

ABNER J. PRICE, OF BUTLER, INDIANA.

ATTACHMENT FOR HARVESTERS.

SPECIFICATION forming part of Letters Patent No. 414,121, dated October 29, 1889.

Application filed October 22, 1888. Serial No. 288,748. (No model.)

*To all whom it may concern:*

Be it known that I, ABNER J. PRICE, a citizen of the United States, residing at Butler, in the county of De Kalb and State of Indiana, have invented certain new and useful Improvements in Attachments to Harvesters; and I do hereby declare the following to be a full, clear, and exact description of the invention, such as will enable others skilled in the art to which it appertains to make and use the same.

My invention is an attachment to harvesters; and it consists in a simple and effective arrangement of mechanism for simultaneously operating the head-board and butter of the binding-table of self-binding harvesters; also, in a novel construction of said butter to form a packer thereof, as and for the purposes as will be hereinafter more fully described, and form the subject-matter of the annexed claims.

The object of my invention is twofold—first, to simultaneously operate the head-board and butter of the binding-table of self-binding harvesters by the adjustment of a single rod or bar, and, second, to pack the sheaf as it is acted on by the butter, and to accomplish these desired results I proceed as follows, reference being had to the accompanying drawings for a better understanding of the details of construction and arrangement of the parts, and in which drawings—

Figure 1 is a view in perspective of my proposed arrangement of parts for operating the tail-board and butter of the binder-table of self-binding harvesters; Fig. 2, a plan in partial section, and Fig. 3 an edge view of the same.

Similar letters of reference indicate like parts in the several views.

A is the binder-table, at each extremity of which are arranged the head-board B and butter C, respectively, which are hinged, as at $b$ and $c$, respectively, to the standards $a$ $a$ of the machine-frame.

D is the operating rod or bar, which is arranged at an angle, with one end convenient to the driver's seat and the other end pivoted to the butter C, as at $c'$. This rod D is held in proper position by a guide E upon a support or cross-piece F of the elevator-frame, and is transversely slotted, as at $d$, to receive the outer end of a short bar or lever G, which bar or lever is pivoted, as at $g$, to a support H, extending out from the cross-piece F, and at its outer end is connected through the intervention of a rod I to the head-board B. The result of this construction is that by the adjustment or movement in or out of the operating-bar D the butter is directly acted on and moved thereby in or out, as the case may be, and at the same time, or simultaneously with such movement of the butter, the head-board is also operated and in the same manner—that is, in or out—through the instrumentality of the pivoted lever G, connected to said bar D, and link I, connected to said lever G and head-board. It will therefore be noted that while the desired object is attained—that of simultaneously operating both the tail board and butter with but a single movement of a single operating-bar—the parts are not complicated, but are few in number and quite simple in construction and operation.

Referring now particularly to the construction of the butter, it will be noted that it is composed of a light frame C, preferably of metal, consisting of a top bar 1 and lower bar 2, separated and held in position by short vertically-placed rods 3, 4, and 5. The rear ends of these bars 1 and 2 are curved, as shown in Fig. 2, and through this curved end the operating-shaft $c$ of the butter passes. To the top bar 1 of the butter the operating-rod D is pivoted, as at $c'$, as before stated. This shaft $c$ extends through the table A, and at its lower end is provided with a pulley or gear-wheel, as at $c^2$, Fig. 3, whereby motion is communicated from the driving mechanism of the machine to said shaft, and this shaft is also formed with a crank, as at $k$, for the purposes as will presently appear.

C' is the face of the butter, which is formed of a sheet-metal plate, with teeth $t$ upon its face, and is connected at its inner end to the crank $k$ of the shaft $c$ by a rod $o$, Fig. 2, and at its lower end slides upon a bar $l$, projecting centrally from the outer vertically-placed rod 3, that connects the top and bottom parts 1 and 2 of the butter-frame together, and passing through a bracket $m$ on said face-plate C'. The result of this construction and arrangement of the butter is that upon the revolution of the shaft $c$ the inner end of the face-plate C' of said butter is caused to travel in an elliptical path, while the lower end thereof simply slides back and forth upon the bar $l$. When, therefore, the butter is adjusted against the sheaf by the rod D, as before explained, the action of the toothed face of said butter upon the butts of the grain adjusts and packs the same into a compact symmetrical bundle.

K is a shield arranged beneath the operating-rods D G and upon the top of the butter C to protect said parts from being clogged by the grain, and this shield is fixed to the cross-piece F of the elevator-frame, as usual; but it does not extend the entire length of said piece F, but, as shown in Fig. 1, terminates a short distance from the face of the butter. Upon the top of the butter is a plate K', which is secured to and moves with said butter, and the inner end of this plate K' overlaps the end of shield K, so that a continuous shield is provided across the top of the parts. In Fig. 2 this shield is omitted or detached to show the parts beneath it.

Having thus described my invention, I claim as new therein—

1. The combination, in a grain-adjuster, with the head-board B and butter C, of the operating-bar D, pivotally connected at $c'$ to the butter and having a slot $d$ therein, guide E, support H, bar G, pivoted at $g$ to the support H, and passing through the slot $d$ of the bar D, whereby the movement of the said bar D is communicated to the bar G, and link I, pivotally connected to the head-board B, as described, for the purposes specified.

2. The combination, with the adjusting-bar D, having a direct pivotal connection with the top of the butter, and shield K', also secured to the top of the butter, of said butter C, composed of the curved top bar 1 and bottom bar 2, rods 3 4, face-plate C', with teeth $t$, rod $o$, shaft $c$, bar $l$, and bracket $m$, all constructed and adapted to operate substantially as and for the purposes set forth and shown.

3. The combination, with the butter C and head-board B, of the shield made in two parts K and K', the part K fixed upon a stationary part of the frame, and the part K' secured to and movable with the butter C, as described, for the purposes specified.

In testimony whereof I hereto affix my signature in presence of two witnesses.

ABNER J. PRICE.

Witnesses:
C. J. COATS,
J. F. GARBEX.